(12) United States Patent
Li et al.

(10) Patent No.: US 8,175,000 B2
(45) Date of Patent: May 8, 2012

(54) METHOD AND APPARATUS FOR MEASURING FORWARD LOAD IN SECTOR, CONTROL METHOD, AND CONTROL APPARATUS THEREOF

(75) Inventors: Wei Li, Shenzhen (CN); Jianzhong Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 12/499,688

(22) Filed: Jul. 8, 2009

(65) Prior Publication Data

US 2009/0268631 A1 Oct. 29, 2009

Related U.S. Application Data

(63) Continuation of application No. PCT/CN2008/071559, filed on Jul. 4, 2008.

(30) Foreign Application Priority Data

Jul. 5, 2007 (CN) .......................... 2007 1 0128417

(51) Int. Cl.
 *H04L 12/26* (2006.01)
(52) U.S. Cl. ........................................ 370/252; 370/310
(58) Field of Classification Search .................. 370/252
 See application file for complete search history.

(56) References Cited

U.S. PATENT DOCUMENTS

| | | | |
|---|---|---|---|
| 5,315,586 A | 5/1994 | Charvillat | |
| 5,838,663 A | 11/1998 | Elwalid et al. | |
| 5,881,049 A | 3/1999 | Beshai et al. | |
| 2003/0048798 A1* | 3/2003 | Scott et al. | 370/412 |
| 2004/0185868 A1 | 9/2004 | Jain et al. | |
| 2005/0201331 A1 | 9/2005 | Gaal et al. | |
| 2008/0279183 A1* | 11/2008 | Wiley et al. | 370/389 |
| 2008/0310405 A1* | 12/2008 | Cox et al. | 370/354 |
| 2010/0037284 A1* | 2/2010 | Sachs | 726/1 |

FOREIGN PATENT DOCUMENTS

| | | |
|---|---|---|
| CN | 1681352 A | 10/2005 |
| CN | 1717950 | 1/2006 |
| CN | 1281093 C | 10/2006 |
| CN | 1910949 | 2/2007 |
| CN | 1983904 | 6/2007 |
| CN | 101068443 | 11/2007 |
| WO | WO 2007001215 A1 * | 1/2007 |

OTHER PUBLICATIONS

Written Opinion of the International Searching Authority mailed Oct. 23, 2008 in corresponding International Patent Application PCT/CN2008/071559.

* cited by examiner

*Primary Examiner* — Jason Mattis
*Assistant Examiner* — Stephen J Clawson
(74) *Attorney, Agent, or Firm* — Staas & Halsey LLP

(57) ABSTRACT

A method for measuring a forward load in a sector includes: acquiring the amount of best-effort (BE) service data respectively transferred by each BE service user in a sector in a predetermined period of time; acquiring a time used by each BE service user for transferring BE service data in the predetermined period of time; and calculating a user equivalent rate of the BE service in the sector for the forward load by using the used time and the amount of the BE service data. The measurement apparatus includes a data amount acquiring unit, a time length acquiring unit, and a rate calculating unit. The measurement method and apparatus can measure a forward load of a BE service in a sector accurately.

11 Claims, 6 Drawing Sheets

METHOD AND APPARATUS FOR MEASURING FORWARD LOAD IN SECTOR, CONTROL METHOD, AND CONTROL APPARATUS THEREOF

CROSS-REFERENCE TO RELATED APPLICATIONS

This application is a continuation of International Application No. PCT/CN2008/071559, filed on Jul. 4, 2008, which claims the benefit of Chinese Patent Application No. 200710128417.6, filed on Jul. 5, 2007, both of which are hereby incorporated by reference in their entireties.

FIELD OF THE TECHNOLOGY

The present invention relates to the field of communications, and more particularly to a method and an apparatus for measuring a forward load in a sector, a control method, and a control apparatus thereof.

BACKGROUND OF THE INVENTION

In a code division multiple access high-rate packet data service version A (EVDO Rev.A), services are classified into assured forwarding (AF) services, expedited forwarding (EF) services, and best-effort (BE) services. Currently, the BE services, such as the Hypertext Transfer Protocol (HTTP) services and the File Transportation Protocol (FTP) services, are mainly implemented in wireless communication networks.

For the BE services, the current network does not provide any insurance measure on the quality of service (QoS), and thus, to acquire a better user satisfaction on the BE services, a method for controlling a forward load of a BE service in a sector is provided in the existing EVDO technology. According to the method, a user number threshold in the sector is set and adapted to control the access of the user. If the number of users having accessed the sector reaches the threshold, a new user is denied access to the sector; otherwise, the new user is allowed access to the sector. Except the above control method, no other control method is provide in the prior art.

The above control method is somewhat effective to the control of the forward load of the BE service in the sector, but the approach of measuring the forward load of the BE service in the sector through the number of users having accessed the sector results in a large difference between the measurement result and the actual forward load of the BE service in the sector. Different users in one sector may have different wireless environments, and thus even if the number of users in the sector is not changed, the forward load of the BE service in the sector might be changed along with the changes of user behaviors. For example, when some users move from areas having a good wireless environment to areas having a poor wireless environment, the users in a poor wireless environment will snatch timeslot resources from the users in a good wireless environment according to the existing fair allocation principle of the timeslot resources, thereby affecting the data transfer of the latter and increasing the forward load of the BE service in the whole sector. However, the number of users in the sector is not changed. Further, changes of network access behaviors of the users also influence the forward load of the BE service in the sector. For example, although the number of users in the sector has not reached the user number threshold yet, changes of the network access behaviors from browsing web pages to downloading files through FTP also increase the forward load of the BE service in the sector, and at this time, the number of users in the sector is not changed as well.

Therefore, through the method for measuring the forward load of the BE service in the sector according to the number of users having accessed the sector in the prior art, when the number of users in the sector does not reach the user number threshold but the actual forward load of the BE service has already been overloaded, if new users are still allowed to access, the user experiences of the BE service will be affected. When the number of users in the sector has reached the user number threshold but the actual forward load of the BE service still has room for new users, denying new users access to the BE services may result in a waste of the network resources and cause inconvenience to the users being denied access.

SUMMARY OF THE INVENTION

In order to accurately measure a forward load of a best-effort (BE) service in a sector, and avoid wasting network resources and affecting the user experience, the present invention is directed to a method and an apparatus for measuring a forward load in a sector, a control method, and a control apparatus thereof.

A method for measuring a forward load in a sector is provided. The method includes the following steps.

The amount of BE service data transferred respectively by each BE service user in the sector in a predetermined period of time is acquired.

The time used respectively by each BE service user for transferring BE service data in the predetermined period of time is acquired.

A user equivalent rate of the BE service in the sector for the forward load is calculated by using the used time and the amount of BE service data.

An apparatus for measuring a forward load in a sector is also provided to calculate a user equivalent rate capable of measuring the forward load of the BE service in the sector. The apparatus includes a data amount acquiring unit, a time length acquiring unit, and a rate calculating unit.

The data amount acquiring unit is adapted to acquire and output the amount of the BE service data transferred respectively by each BE service user in a predetermined period of time.

The time length acquiring unit is adapted to acquire and output the time used respectively by each BE service user for transferring the BE service data in the predetermined period of time.

The rate calculating unit is adapted to receive the amount of the BE service data from the data amount acquiring unit and the used time from the time length acquiring unit, calculate the user equivalent rate by using the used time and the amount of the BE service data, and output information about the user equivalent rate.

A method and an apparatus for controlling a forward load of a BE service in a sector are further provided on the basis of the above measurement technical solutions.

A method for controlling a forward load in a sector by using the above measurement method includes the following steps.

A user equivalent rate of a BE service in the sector for measuring the forward load of the BE service in the sector is acquired.

Access control is exercised over a BE service user requesting to access the sector according to the user equivalent rate, or a BE service user in the sector is deleted according to the user equivalent rate.

An apparatus for controlling a forward load in a sector includes an apparatus for measuring the forward load in the sector and a load control module.

The apparatus for measuring the forward load in the sector is adapted to calculate a user equivalent rate of a BE service in the sector for measuring the forward load of the BE service in the sector, and output information about the user equivalent rate.

The load control module is adapted to receive the information about the user equivalent rate from the measurement apparatus, and exercise access control over a BE service user requesting to access the sector according to the user equivalent rate, or delete a BE service user in the sector according to the user equivalent rate.

According to the measurement method and apparatus provided in the embodiments of the present invention, the user equivalent rate capable of embodying the forward load of the BE service in the sector is calculated by using the amount of the BE service data transferred in a predetermined period of time that reflects the actual behaviors of the BE service user for transferring the BE service data in the sector, so that the forward load of the BE service in the sector can be measured accurately.

According to the method and apparatus for controlling the forward load provided in the embodiments of the present invention, the forward load of the BE service in the sector is accurately measured according to the above measurement solutions, and control is exercised on the forward load, including: exercising access control over the BE service user requesting to access the sector, or deleting a BE service user that has already accessed the sector. Therefore, the forward load of the BE service in the sector is better controlled, thus improving the availability of system resources and ensuring satisfactory user experience.

DETAILED DESCRIPTION OF THE EMBODIMENTS

The technical solutions provided in the embodiments of the present invention are described in detail below with reference to the accompanying drawings.

In a method for measuring a forward load of a BE service in a sector by using the number of users that have already accessed the sector, the measurement result may be quite different from the actual forward load of the BE service in the sector, and the reason is as follows. The method fails to consider that the participation of the user in the data transfer of the BE service, e.g., the actual network access behaviors of the user, may affect the forward load of the BE service in the sector. For example, when a user in a poor wireless environment transfers BE service data, timeslot resources of users in a good wireless environment may be snatched, and thus the latter has fewer opportunities to transfer BE service data. Moreover, the user in a poor wireless environment has a low data transfer rate of the BE service, so the user may sense a lowered transfer rate. The magnitude of the forward load of the BE service in the sector embodies the capacity of a base station for providing services to the users, and the user sensing the lowered rate indicates an increase of the forward load. In other words, the increase of the forward load of the BE service in the sector directly results in a lowering rate sensed by the user. Further, changes of the network access behaviors of the BE service user in the sector also influence the forward load of the BE service in the sector. For example, a static online state of the user has a different impact on the forward load of the BE service in the sector compared with the behavior of transferring BE service data, and the latter may increase the forward load of the BE service in the sector.

In consideration that the actual participation of the user in transferring BE service data affects the forward load of the BE service in the sector, a concept of a user equivalent rate of the BE service in the sector is provided in the embodiments of the present invention. This concept embodies the actual participation of the user in the data transfer of the BE service, and the forward load of the BE service in the sector is estimated by measuring the user equivalent rate, so as to exercise effective control over the forward load of the BE service in the sector according to an accurate measurement result.

Figure 1:
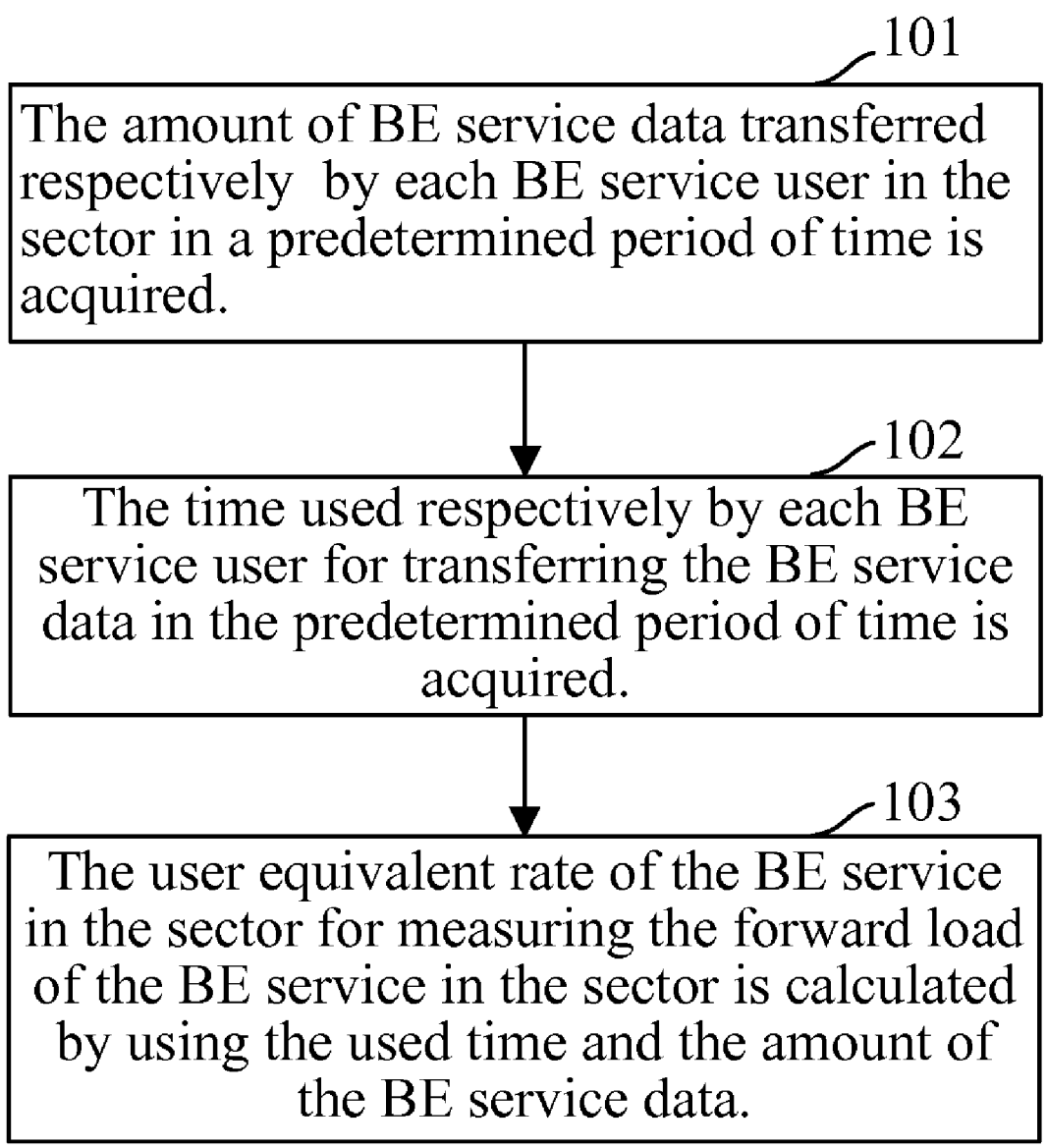
FIG. 1 is a flow chart of a method for measuring a forward load in a sector according to an embodiment of the present invention.

FIG. 1 is a flow chart of a method for measuring a forward load in a sector according to an embodiment of the present invention. The method includes the following steps.

In Step 101, the amount of BE service data transferred respectively by each BE service user in the sector in a predetermined period of time is acquired.

In the embodiments of the present invention, acquiring the amount of the BE service data may be accomplished by a base station channel processing chip on the basis of the current traffic control capacity, but a base station main control module must be informed to acquire the amount of the BE service data, where the amount of the BE service data is required in the embodiments of the present invention.

In Step 102, the time used respectively by each BE service user for transferring the BE service data in the predetermined period of time is acquired.

In the embodiments of the present invention, acquiring the time may also be accomplished by the base station. That is, on the basis of the traffic control capacity of the base station, the base station is informed to record the time used by the BE service user for transferring the BE service required in the embodiments of the present invention.

In Step 103, the user equivalent rate of the BE service in the sector for measuring the forward load of the BE service in the sector is calculated by using the used time and the amount of the BE service data.

In the embodiments of the present invention, the method for calculating the user equivalent rate includes the following steps. A total amount of the BE service data transferred in the sector in the predetermined period of time is acquired according to the amount of the BE service data transferred respectively by each BE service user in the predetermined period of time. A total time used by all the BE service users participating in transferring data the BE service in the sector in the predetermined period of time is acquired according to the time used by each BE service user for transferring the BE service data in the predetermined period of time. The user equivalent rate is determined according to a calculation result of dividing the total amount of the BE service data by the total time. Alternatively, the total amount of the BE service data transferred in the sector in the predetermined period of time is acquired according to the amount of the BE service data transferred respectively by each BE service user in the predetermined period of time. An average amount of the BE service data transferred by each user participating in transferring data the BE service in this period is acquired according to the total amount of the BE service data and the number of the BE service users participating in transferring data the BE service. The user equivalent rate is determined according to a calculation result of dividing the average amount of the BE service data by a time length of this period.

The acquiring of the total time used by all the users, participating in the data transfer of the BE service in the predetermined period of time, of the BE service in the sector includes: adding the time used by each BE service user for transferring the BE service data in the predetermined period of time. Alternatively, if the time used by each BE service user for transferring the BE service data participating in the data transfer of the BE service in the predetermined period of time is the time length of the predetermined period of time, the total time may be acquired by multiplying the number of the BE service users participating in transferring BE service data in the predetermined period of time with the time length of the predetermined period of time.

In the embodiments of the present invention, the forward load of the BE service in the sector is measured by the user equivalent rate in the sector, and the corresponding relation between the two is as follows. The higher the user equivalent rate of the BE service in the sector is, the lighter the forward load of the BE service in the measured sector will be; and on the contrary, the lower the user equivalent rate of the BE service in the sector is, the heavier the forward load of the BE service in the measured sector will be.

For ease of illustration, the forward load of the BE service in the sector is referred to as the forward load for short, and the user equivalent rate in the sector is referred to as the user equivalent rate for short below, if there are no special requirements.

In the embodiments of the present invention, an implementation for calculating the user equivalent rate is provided. Assuming that X the BE service users exist in the sector, m the BE service users in the sector transferring the BE service data in a period of time T, m is greater than or equal to 1, and the m users continuously transfer the BE service data in the period of time T. Therefore, a total amount D of the BE service data transferred by all the BE service users in the sector in the period of time T is calculated. Next, D is divided by m to acquire an average amount of the BE service data transferred by each user participating in the data transfer of the BE service in the period of time T, and then the average amount of the BE service data is divided by T to acquire a rate R of each user for transferring the BE service data among the m the BE service users in the period of time T according to the embodiments of the present invention. A formula for calculating R is:

$$R=(D/m)/T \quad (1)$$

The rate R may serve as the user equivalent rate in the period of time T.

In the embodiments of the present invention, the implementation of Formula (1) may also be replaced by Formula (2):

$$R=D/(m \times T) \quad (2)$$

In Formula (2), (m×T) is a product of the number of the BE service users participating in the data transfer of the BE service in this period of time and the time length of this period of time, which indicates a total time used by all the BE service users in the sector participating in the data transfer of the BE service. For the BE service users not participating in transferring data the BE service, the time used by them for transferring the BE service data is zero.

Logically, D and T in Formula (2) are corresponding to each other; however, in consideration of some cases, the BE service users may not always transfer the BE service data in the selected period of time T. For example, in a selected 20 s, one user transfers data in the first 15 s, and two users transfer data in the last 5 s. Therefore, if R is calculated strictly through Formula (2), it is rather difficult to count the number m, so one of the solutions is to divide the period of time T into smaller segments and calculate R in a shorter period of time. However, as the network access behavior of the user is dynamic, the same difficulty in the calculation of R in the period of time T may inevitably occur in the shorter period of time.

In the embodiments of the present invention, the implementation of Formula (1) or (2) may also be replaced by Formula (3) for improvement, in which Th indicates the user equivalent rate. The formula for calculating the user equivalent rate in the sector according to the embodiments of the present invention is:

$$Th=D/\text{Time} \quad (3)$$

Formula (3) represents the user equivalent rate calculated in a predetermined period of time t, and the user equivalent rate equals a result acquired by dividing a total data amount D of the BE service transferred by all the BE service users in the sector in the period of time t by a total time "Time" used by each BE service user participating in transferring data the BE service for transferring the BE service data. The time used by each user for transferring the BE service data may also be referred to as a participation time of the user.

Formulae (1), (2), and (3) are equivalent, as Formula (3) actually converts the number of users in the period of time T in Formula (1) or (2). For example, it is assumed that t is 60 s, and three the BE service users, namely, A, B, and C, exist in the sector, in which the participation time of A is the first 20 s, and the data amount transferred thereby is D1; the participation time of B is the middle 20 s, and the data amount transferred thereby is D2; and the participation time of C is the last 40 s, and the data amount transferred thereby is D3. It is quite difficult to calculate the average data transfer rate for the users in the 60 s, i.e., the user equivalent rate, directly by using Formula (1). However, according to Formula (3), the user equivalent rate in the sector is calculated as follows:

$$Th=D/\text{Time}=(D1+D2+D3)/(20\ s+20\ s+40\ s) \quad (4)$$

In Formula (4), $$\text{Time}=20\ s+20\ s+40\ s=(1+\tfrac{1}{3})\times 60\ s \quad (5)$$

which actually equals the expression of Formula (2) as follows:

$$m \times T=(1+\tfrac{1}{3})\times 60\ s$$

That is to say, the equivalent number of users continuously transferring data in the 60 s is (1+⅓).

The above example is not a scrabbling of numerals or coincidence, but indicates that Formula (3) implies an equivalent conversion on the equivalent number of users continuously transferring the data in the period of time t.

In addition, physically speaking, the rate means a speed at a certain moment, and it can be known from Formulae (1), (2), and (3) that, in the embodiments of the present invention, the user equivalent rate is actually a mean value of the rate in a period of time. Theoretically speaking, the user equivalent rate in the embodiments of the present invention is not so precise, but in actual sense, the user equivalent rate may be a mean value. The reason is that it is difficult to precisely measure the value of D at every moment in the sector, which has a high requirement on the measurement technique. Moreover, in practice, when controlling the forward load of the BE service in the sector, it is unnecessary to use a measurement result with such high precision. In addition, the user equivalent rate may be affected by noises in an actual network environment.

The forward load in a sector in a period of time may be measured by using a user equivalent rate. For example, in a current period of time, the current user equivalent rate in the sector (the current user equivalent rate for short) is adapted to measure the current forward load of the BE service in the sector (the current forward load for short). If the current forward load is excessively high, control is exercised over the current forward load, including: exercising access control over the BE service user or deleting the BE service user in the sector located in an area of poor wireless environment.

Further, given that the user equivalent rate may be affected by noises in practice, to prevent the detected user equivalent rate from being seriously interfered in accidents, the calculation result acquired from Formula (1), (2), or (3) is not directly used as the user equivalent rate. Instead, the calculation result is filtered, and the filtered result servers as the user equivalent rate. Correspondingly, in a rate calculating unit, the algorithm stored in a first information storage module may be any one of Formulae (1), (2), and (3). If the filtering process is not required, the calculation result output by a calculating module directly serves as the user equivalent rate, and if the filtering process is required, a filtering module is adapted to filter the calculation result output by the calculating module, and then output the filtered result as the user equivalent rate.

It is assumed that in the sector, the user equivalent rate in the current predetermined period of time T(n) is AvgTh(n), the user equivalent rate in the previous period of time T(n−1) is AvgTh(n−1), a weight of AvgTh(n) in the filtering process is a, the weight embodies the contribution of the current user equivalent rate to the measured forward load, and a default value of $\alpha$ is set to 0.5. A formula for performing a filtering process on AvgTh(n) is as follows:

$$AvgTh(N)=(1-\alpha)AvgTh(n-1)+\alpha AvgTh(n) \quad (6)$$

AvgTh(N) is a result after filtering, and is adapted to measure the user equivalent rate of the forward load in the period of time T(n). If the user equivalent rates in consecutive periods of time are filtered, changes between these user equivalent rates tend to be smooth. Moreover, in a certain period of time, the higher the user equivalent rate is, the lighter the forward load will be; and on the contrary, the lower the user equivalent rate is, the heavier the forward load will be.

Figure 2:
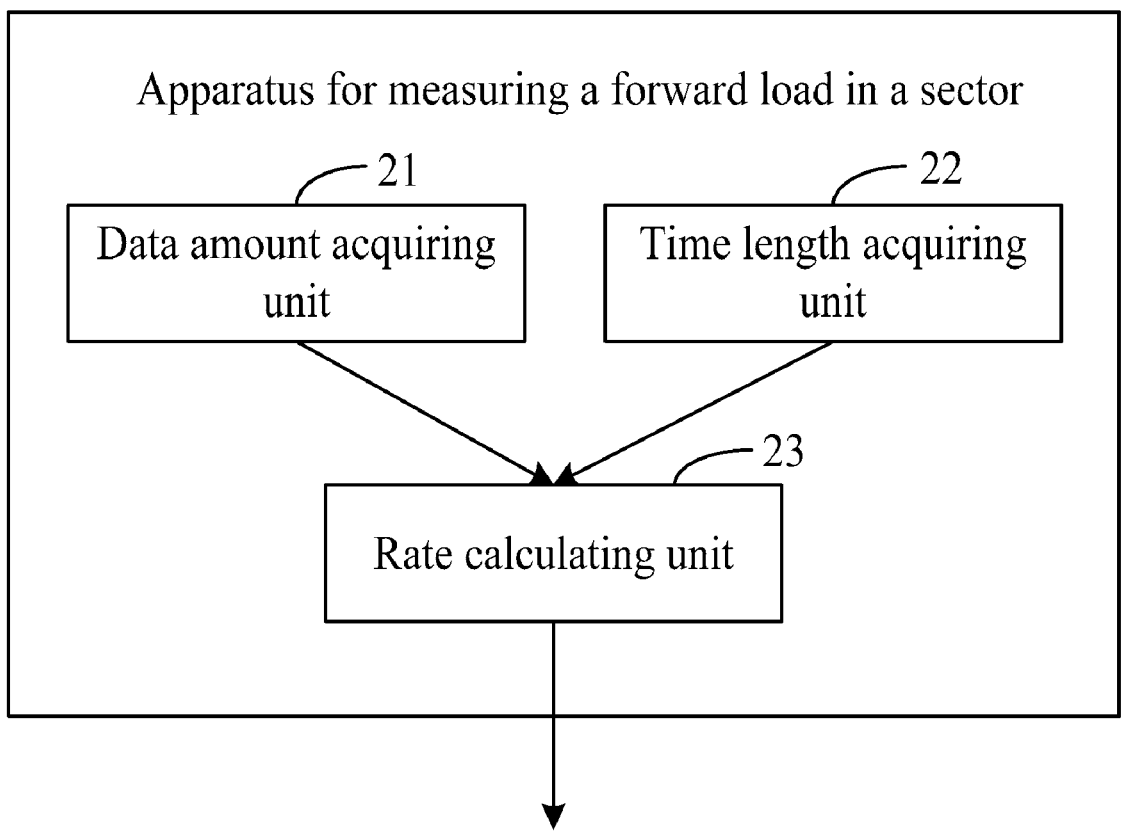
FIG. 2 is a schematic structural view of an apparatus for measuring a forward load in a sector according to an embodiment of the present invention.

Based on the above measurement method, an apparatus for measuring a forward load in a sector is further provided in an embodiment of the present invention. FIG. 2 is a schematic structural view of the measurement apparatus according to an embodiment of the present invention. The measurement apparatus is adapted to calculate a user equivalent rate of a BE service in the sector for measuring the forward load of the BE service in the sector. The apparatus includes a data amount acquiring unit 21, a time length acquiring unit 22, and a rate calculating unit 23.

The data amount acquiring unit 21 is adapted to acquire and output the amount of the BE service data transferred respectively by each BE service user in the sector in a predetermined period of time.

The time length acquiring unit 22 is adapted to acquire and output a time used respectively by each BE service user for transferring the BE service data in the predetermined period of time.

The rate calculating unit 23 is adapted to receive the amount of the BE service data from the data amount acquiring unit and the required time from the time length acquiring unit, calculate the user equivalent rate by using the used time and the amount of the BE service data, and output information about the user equivalent rate.

Figure 3:
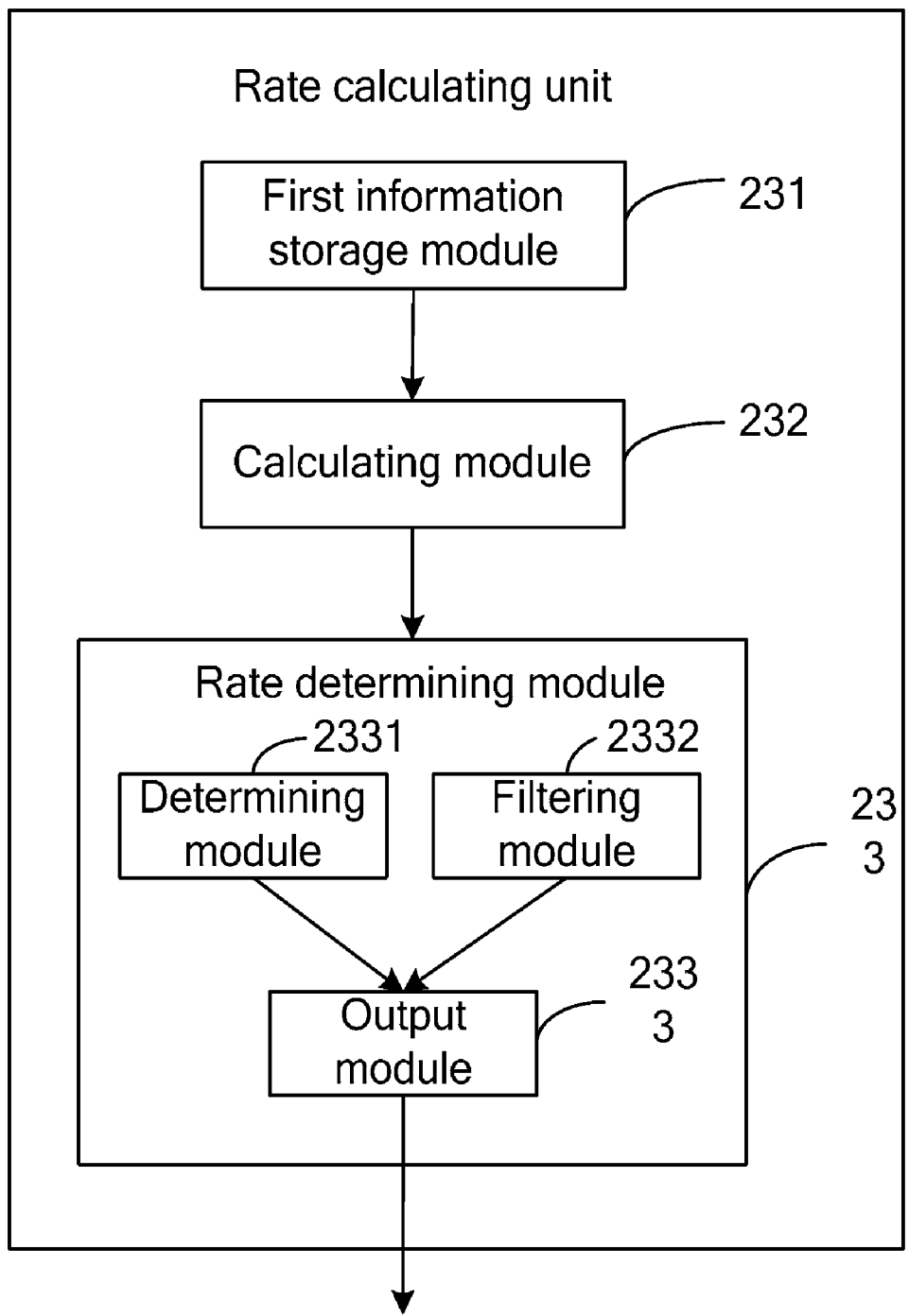
FIG. 3 is a schematic structural view of a rate calculating unit in FIG. 2.

FIG. 3 is a schematic structural view of the rate calculating unit according to an embodiment of the present invention.

The rate calculating unit includes a first information storage module 231, a calculating module 232, and a rate determining module 233.

The first information storage module 231 is adapted to receive and store the amount of the BE service data from the data amount acquiring unit and the used time from the time length acquiring unit 22, and output the stored information.

The calculating module 232 is adapted to receive the information from the first information storage module, acquire a total amount of the BE service data transferred in the sector in the predetermined period of time according to the amount of the BE service data transferred respectively by each BE service user in the predetermined period of time, acquire a total time used by all the BE service users participating in transferring data the BE service in the sector in the predetermined period of time according to the time used respectively by each BE service user for transferring the BE service data in the predetermined period of time, acquire a calculation result by dividing the total amount of the BE service data by the total time required, and output the calculation result.

Alternatively, the calculating module 232 is adapted to acquire a total amount of the BE service data transferred in the sector in the predetermined period of time according to the amount of the BE service data transferred respectively by each BE service user in the predetermined period of time, acquire an average amount of the BE service data transferred by each user participating in transferring data the BE service in the predetermined period of time according to the total amount of the BE service data and the number of the BE service users participating in transferring data the BE service in the predetermined period of time, acquire a calculation result by dividing the average amount of the BE service data by a time length of the predetermined period of time, and output the calculation result.

The rate determining module 233 is adapted to receive the calculation result from the calculating module, and determine a user equivalent rate by using the calculation result.

Further, the rate determining module 233 includes an output module 2333, a determining module 2331, and a filtering module 2332.

The determining module 2331 is adapted to send the calculation result to the output module as the user equivalent rate.

The filtering module 2332 is adapted to filter the calculation result, and send the filtered result to the output module as the user equivalent rate.

The output module 2333 is adapted to receive and output the user equivalent rate from the determining module 2331 or the filtering module 2332.

The above measurement method and apparatus can accurately measure the forward load of the BE service in the sector, and control the forward load by using the measurement result.

Figure 4:
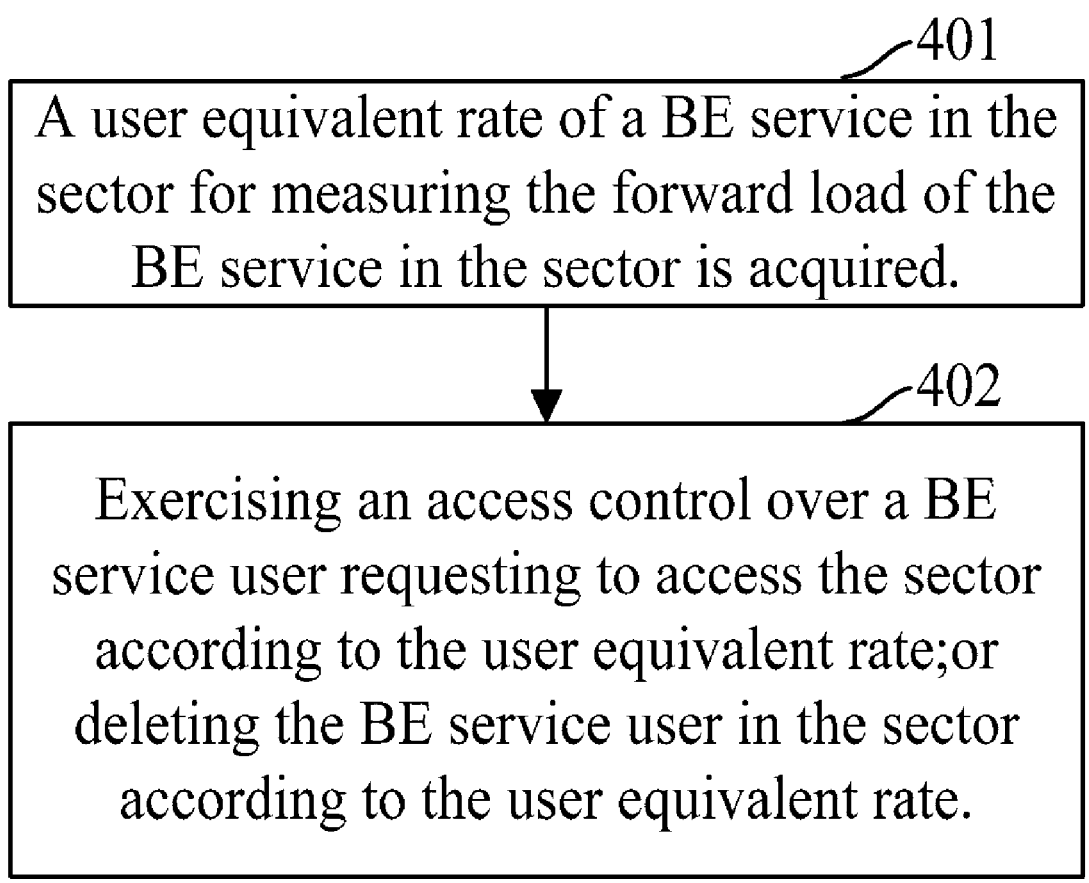
FIG. 4 is a flow chart of a method for controlling a forward load in a sector according to an embodiment of the present invention.

FIG. 4 is a flow chart of a method for controlling a forward load in a sector according to an embodiment of the present invention. The method includes the following steps.

In Step 401, a user equivalent rate of a BE service in the sector for measuring the forward load of the BE service in the sector is acquired.

In Step 402, access control is exercised over a BE service user requesting to access the sector according to the user equivalent rate, or the BE service user in the sector is deleted according to the user equivalent rate.

In the embodiments of the present invention, the user equivalent rate capable of measuring the forward load of the BE service in the sector is acquired through the above method and apparatus for measuring a forward load in a sector, and control is exercised over the forward load of the BE service in the sector by using the user equivalent rate. For example, access control is exercised over a BE service user requesting to access the sector (a new user for short) according to the acquired user equivalent rate together with preset access conditions, or the BE service user having accessed the sector is deleted according to the user equivalent rate together with a preset load control condition.

A rate access threshold, a rate limit threshold, and a rate control threshold may be preset. In the embodiments of the present invention, given that the number of the BE service users in the sector is one of the factors affecting the forward load of the BE service in the sector, a maximum number of users in the sector is preset, and the access control or deletion process is further implemented on the basis of the maximum number of users. The rate access threshold is higher than the rate limit threshold, and the rate limit threshold is higher than the rate control threshold.

The access conditions include the following cases.

If the user equivalent rate in a certain period of time is higher than the rate access threshold, the new user is allowed to access, that is, the forward load in the period of time is light, and the access of the new user is not limited.

If the number of the BE service users in the sector is smaller than the maximum number of users in the sector, the new user is allowed to access. This condition is applicable to the circumstance that most of the BE service users in the sector are located in areas with poor wireless environment, and the number of the BE service users in the sector is insufficient.

The access conditions further include the following cases.

If the user equivalent rate in a certain period of time is lower than the rate access threshold but higher than the rate limit threshold, and the number of the BE service users in the sector is larger than the maximum number of users in the sector, the new user having a wireless environment measurement value greater than a preset wireless environment access threshold is allowed to access, that is, the new user in a good wireless environment is allowed access, while the new user in a poor wireless environment is denied access. Thereby, in this period of time, the forward load is not overloaded yet, and new users may still access the sector. The measurement for the wireless environment of the user may be implemented by using the wireless environment measurement value, and the wireless environment measurement value may be data rate control (DRC) information, i.e., a DRC value, capable of embodying the condition of the wireless environment of the user. If the DRC value of the wireless environment of the user is greater than the wireless environment access threshold, it indicates that the user is in a good wireless environment; otherwise, the user is in a poor wireless environment.

If the user equivalent rate in a certain period of time is lower than the rate limit threshold but higher than the rate control threshold, and the number of the BE service users in the sector is larger than the maximum number of users in the sector, the new user is denied access to the sector. Thereby, in this period of time, the forward load is determined to be overloaded, so that the new user either in a good wireless environment or in a poor wireless environment is denied access to the sector.

The load control condition includes the following case.

If the user equivalent rate in a certain period of time is lower than the rate control threshold, and the number of the BE service users in the sector is larger than the maximum number of users in the sector, the forward load of the BE service in the sector is overloaded, and the BE service user in the poorest wireless environment in the sector may be deleted from the sector.

The conditions required by the access control or the deletion process are illustrated below through examples. For instance, the rate access threshold TH1 is set to 256 kbps, the rate limit threshold TH2 is set to 168 kbps, and the rate control threshold TH3 is set to 64 kbps, i.e., TH1>TH2>TH3. If the user equivalent rate in a period of time is higher than TH1, the forward load in this period of time is small, and if the user equivalent rate in a period of time is lower than TH3, the forward load in this period of time is excessively large. Accordingly, the access conditions include the following cases.

1) If $AvgTh(N)>TH1$, the new user is allowed to access.

2) If $UserN<UserN_{max}$, the new user is allowed to access.

The condition 2) may be subdivided as follows: if $TH2<AvgTh(N)<TH1$ and $UserN<UserN_{max}$, the new user is allowed to access; if $TH3<AvgTh(N)<TH2$ and $UserN<UserN_{max}$, the new user is allowed to access; and if $AvgTh(N)<TH3$ and $UserN<UserN_{max}$, the new user is allowed to access.

3) If $TH2<AvgTh(N)<TH1$ and $UserN>UserN_{max}$, the new user having the wireless environment measurement value greater than the preset wireless environment access threshold is allowed to access, that is, the new user in a good wireless environment is allowed to access, while the new user in a poor wireless environment is denied access.

4) If $AvgTh(N)<TH2$ and $UserN>UserN_{max}$, the new user either in a good wireless environment or in a poor wireless environment is denied access.

The load control condition includes the following case.

5) If $AvgTh(N)<TH3$ and $UserN>UserN_{max}+\Delta Num$, a deletion process is started, so as to delete from the sector the user in the poorest wireless environment among all the BE service users in the sector. In addition, $\Delta Num$ is an adjustable value of the BE service users in the sector, and this value is determined according to the actual network environment.

In practice, the access control and deletion process of the user may be performed separately.

Further, in actual implementation, the above conditions or combinations thereof may be adopted with reference to the access or load control conditions to exercise control over the forward load. Moreover, if all the access conditions and the load control condition are adopted, a ping-pong access of the user may be avoided. The so-called ping-pong access means that when the user is allowed to access according to the access conditions, but the access of the user results in an increase of the forward load of the BE service in the sector that exceeds the load control threshold, so the user has to be deleted from the sector according to the load control condition.

Some relatively common access or load control conditions are illustrated in the embodiments of the present invention, and those conditions may be set as desired in actual applications.

When exercising access control or deleting the user, the user may be treated according to the condition of the wireless environment of the user. In the embodiments of the present invention, the DRC value of the wireless environment of the user, i.e., the wireless environment measurement value, is adapted to measure the condition of the wireless environment of the user.

Figure 5:
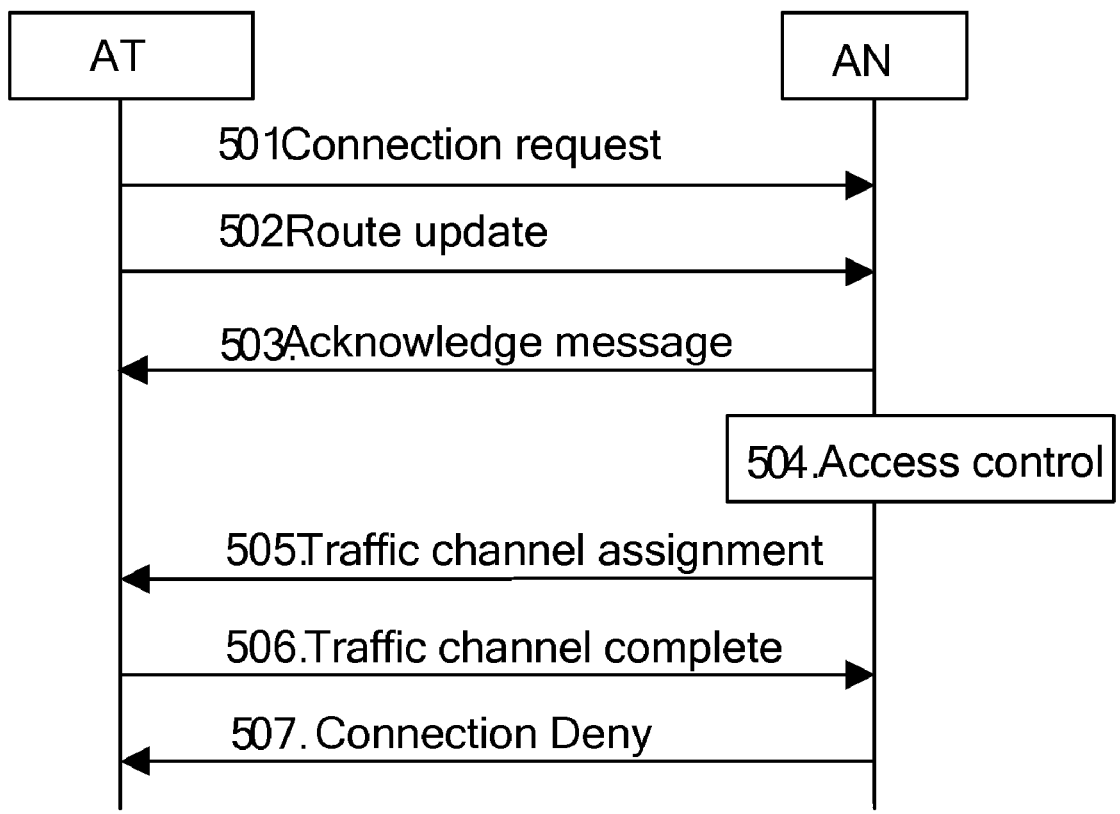
FIG. 5 is a flow chart of exercising access control over a user requesting to access a sector according to an embodiment of the present invention.

As for the user requesting to access the wireless communication network, the DRC information about the wireless environment of the user is acquired by using a RouteUpdate (RU) message sent by an access terminator (AT) of the user. FIG. 5 is a flow chart of exercising access control over a user according to an embodiment of the present invention, and the process includes the following steps.

In Step 501, an AT sends a connection request to an access network (AN) for requesting to access a wireless communication network, and starts a status timer.

In Step 502, when a pilot strength of the AT exceeds a Pilotadd threshold, i.e., a ratio of a channel chip power to a total receiving power (Ec/Io=−7 db), the AT continues to send the RU and requests to indicate the wireless environment of the AT.

In this step, Ec/Io=−7 db is a pilot strength threshold provided by the 3GPP protocol. Based on the 3GPP protocol, a ratio value (C/I) of effective signal strength to interference strength is acquired according to the Ec/Io, and the DRC information used for measuring the wireless environment of the user is acquired through looking up table according to the C/I value. Table 1 is a partial comparison table of C/I and DRC in the 3GPP protocol.

TABLE 1

| DRC index | Timeslot number | Modulation method | Preamble chip number | Static charge number | Rate (kb/s) | C/I (db) |
|---|---|---|---|---|---|---|
| 0x0 | n/a | QPSK | n/a | 0 | null rate | n/a |
| 0x1 | 16 | QPSK | 1024 | 1024 | 38.4 | −11.5 |
| 0x2 | 8 | QPSK | 512 | 1024 | 76.8 | −9.2 |
| 0x3 | 4 | QPSK | 256 | 1024 | 153.6 | −6.5 |
| 0x4 | 2 | QPSK | 128 | 1024 | 307.2 | −3.5 |
| 0x5 | 4 | QPSK | 128 | 2048 | 307.2 | −3.5 |
| 0x6 | 1 | QPSK | 64 | 1024 | 614.4 | −0.6 |
| 0x7 | 2 | QPSK | 64 | 2048 | 614.4 | −0.5 |
| 0x8 | 2 | QPSK | 64 | 3072 | 921.6 | +2.2 |
| 0x9 | 1 | QPSK | 64 | 2048 | 1228.8 | +3.9 |
| 0xa | 2 | 16QAM | 64 | 4096 | 1228.8 | +4.0 |
| 0xb | 1 | 8PSK | 64 | 3072 | 1843.2 | +8.0 |
| 0xc | 1 | 16QAM | 64 | 4096 | 2457.6 | +10.3 |
| 0xd | 2 | 16QAM | 64 | 5120 | 1536.0 | Rev. A |
| 0xe | 1 | 16QAM | 64 | 5120 | 3072.0 | Rev. A |

In this step, the RU message carries the current Ec/Io value of the AT, and a corresponding C/I value is acquired according to the Ec/Io value. In the embodiments of the present invention, the threshold C/I used for determining the condition of the wireless environment of the user is set as −6.5 db, and a corresponding DRC value threshold may be acquired through looking up table according to the C/I value. The DRC value threshold may be considered as the wireless environment access threshold mentioned when exercising the access control or load control. That is to say, when the C/I value of the current AT is smaller than −6.5 db or the current DRC value is smaller than the DRC value corresponding to −6.5 db, it is determined that the wireless environment of the user is poor; otherwise, the wireless environment of the user is satisfactory.

In Step 503, the AN returns an acknowledge message to the AT, so as to acknowledge that the RU message is received.

In Step 504, the AN calculates the user equivalent rate for measuring the forward load of the BE service in the sector according to the preset algorithm of calculating the user equivalent rate, and exercises access control over the user according to preset access conditions. Step 505 is performed if it is determined that the user is allowed to access; otherwise, Step 507 is performed.

In this step, the RU message carries information about preamble channel strength of the user, and the corresponding DRC value is acquired through looking up table.

In Step 505, the AN sends a traffic channel assignment message to the AT after determining that the user is allowed to access.

In Step 506, the AT sends a channel establishment complete message to a base station through a service channel, and turns off the status timer, so the access control process on the user is finished.

In Step 507, the AN sends a Connection Deny message to the AT after determining that the user is not allowed to access, so as to refuse the access of the user.

In this step, the Connection Deny message carries a reason value of denying the user access, and the reason value indicates that the number of users is full or the wireless environment of the user is poor, or the like.

Figure 6:
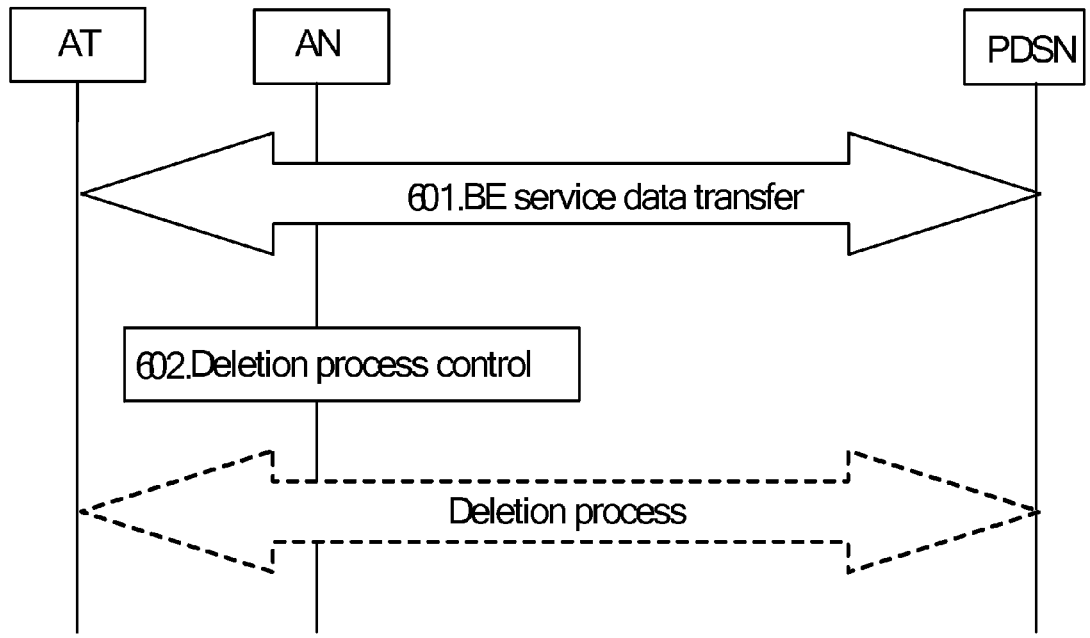
FIG. 6 is a flow chart of deleting a user that has already accessed a sector according to an embodiment of the present invention.

FIG. 6 is a flow chart of deleting the user according to an embodiment of the present invention. The process includes the following steps.

In Step 601, the user that has already accessed transfers the BE service data with a packet data serving node (PDSN) through the AT.

In Step 602, the AN performs a deletion process according to the acquired information about the forward load of the BE service in the sector together with the load control condition, that is, the AN determines whether it is necessary to delete the user in the sector or not, and if yes, the subsequent process of deleting the AT from the sector is started. At this point, the deletion process on the AT is completed.

The process of deleting the AT from the sector may be implemented based on the prior art.

In this embodiment, the DRC value of the user having accessed the wireless communication network can be acquired through the base station. It is set that every time the base station sends a certain number of media access control (MAC) packets, the DRC information about the packets of the user is acquired through callback functions. The DRC information is also an implementation of traffic control of the base station, so the approach of acquiring the DRC value of the user that has already accessed will not exert additional processing burdens on the base station. In order to reduce the influence of noises to the acquired DRC value, the DRC value may also be filtered.

In the process shown in FIG. 5 or FIG. 6, a base station controller (BSC) and a base transceiver station (BTS) in the AN participate in the process. That is to say, the BSC sends parameters of the measurement algorithm to the BTS, the BTS acquires the information about the forward load of the BE service in the sector and sends the information to the BSC, and the BSC exercises an access control over the new user according to the access conditions deployed therein. The BTS is able to acquire the DRC information about the user that has already accessed, i.e., the AT in the sector, in real time, and send the DRC information to the BSC. The BSC deletes the user having the poorest DRC value in the sector according to the load control condition deployed therein, i.e., to release the call of the user.

Figure 7:
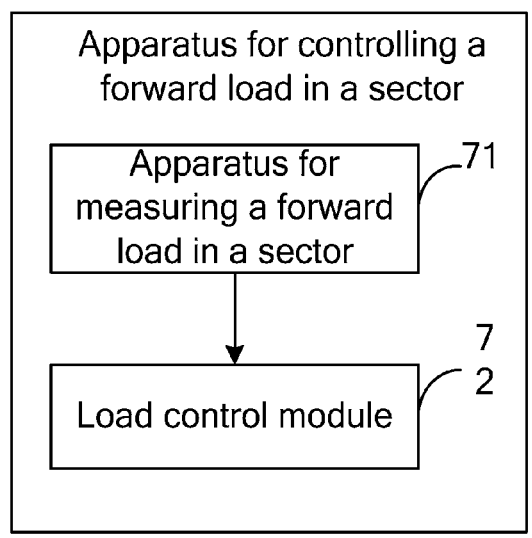
FIG. 7 is a schematic structural view of an apparatus for controlling a forward load in a sector according to an embodiment of the present invention.

FIG. 7 is a schematic structural view of an apparatus for controlling a forward load in a sector according to an embodiment of the present invention. The control apparatus includes an apparatus 71 for measuring a forward load in a sector and a load control module 72.

The apparatus 71 for measuring a forward load in a sector is adapted to calculate a user equivalent rate capable of measuring the forward load of the BE service in the sector, and output information about the user equivalent rate.

The load control module 72 is adapted to receive the information about the user equivalent rate from the measurement apparatus, exercise access control over the BE service user requesting to access the sector according to the user equivalent rate, or delete the BE service user in the sector according to the user equivalent rate.

Details about the measurement apparatus may be acquired with reference to the above descriptions.

The load control module 72 may include a second information storage module and a first control module.

The second information storage module is adapted to save the information about the user equivalent rate from the measurement apparatus and the information about the preset access conditions required by the access control, and send the saved information to the first control module.

The first control module is adapted to receive the information from the second information storage module, and exercise access control over the BE service user requesting to access the sector according to the access conditions and the user equivalent rate.

The load control module may also include a third information storage module and a second control module.

The third information storage module is adapted to save the information about the user equivalent rate from the measurement apparatus and the preset load control condition required by the deletion process, and send the saved information to the second control module.

The second control module is adapted to receive the information from the third information storage module, and delete the BE service user in the sector according to the load control condition and the user equivalent rate.

The load control module may include the second information storage module and the first control module as well as the third information storage module and the second control module at the same time.

The measurement apparatus may be disposed separately, or disposed on the base station in the AN together with the load control module.

In view of the above, according to the measurement method and apparatus provided in the embodiments of the present invention, the user equivalent rate capable of embodying the forward load of the BE service in the sector is calculated by using the amount of the BE service data transferred in a predetermined period of time that reflects the actual behavior of the BE service user for transferring the BE service data in the sector, so that the forward load of the BE service in the sector can be measured accurately.

According to the method and apparatus for controlling the forward load provided in the embodiments of the present invention, the forward load of the BE service in the sector is accurately measured according to the above measurement solutions, and control is exercised over the forward load, including: exercising access control over the BE service user requesting to access, or deleting the BE service user that has already accessed the sector. Therefore, the forward load of the BE service in the sector is better controlled, thus improving the availability of system resources and ensuring satisfactory user experience.

The above embodiments of the present invention are for illustration only, instead of limiting the scope of the invention.

What is claimed is:

1. A method for controlling a forward load in a sector, comprising:
    acquiring an amount of best-effort (BE) service data transferred respectively by each BE service user in the sector in a predetermined period of time;
    acquiring time used respectively by each BE service user for transferring BE service data respectively in the predetermined period of time;
    calculating a user equivalent rate of the BE service in the sector for the forward load according to the acquired time and the amount of BE service data; and
    exercising access control over a new BE service user requesting to access the sector according to the user equivalent rate, wherein the access control is further exercised according to a preset access condition that comprises:
    if the user equivalent rate in a certain period of time is lower than a rate access threshold but higher than a rate limit threshold, and a number of BE service users in the sector is larger than a maximum number of users in the sector, the new BE service user whose wireless environment measurement value is greater than a preset wireless environment access threshold is allowed to access; and
    if the user equivalent rate in a certain period of time is lower than the rate limit threshold but higher than a rate control threshold, and the number of the BE service users in the sector is larger than the maximum number of users in the sector, the new BE service user is denied access,
    wherein the rate access threshold is higher than the rate limit threshold, and the rate limit threshold is higher than the rate control threshold.

2. The method for controlling a forward load in a sector according to claim 1, wherein the denying of access to the new BE service user comprises:
    returning a response message carrying a reason value of denying the access.

3. The method for controlling a forward load in a sector according to claim 1, further comprising:
    if the user equivalent rate is lower than the rate control threshold, and a number of BE service users in the sector is larger than a maximum number of users in the sector, deleting a BE service user in a poorest wireless environment in the sector.

4. The method according to claim 1, wherein the calculating of the user equivalent rate of the BE service comprises:
    acquiring a total amount of the BE service data transferred in the sector in the predetermined period of time according to an amount of BE service data transferred respectively by each BE service user in the predetermined period of time;
    acquiring a total time used by all BE service users transferring the BE service data in the sector in the predetermined period of time, according to a time used respectively by each BE service user respectively transferring the BE service data in the predetermined period of time; and determining the user equivalent rate, according to a calculation result of dividing the total amount of the BE service data by the total time.

5. The method to claim 4, wherein the acquiring of the total time comprises:
calculating a sum of time used by all BE service users transferring the BE service data in the predetermined period of time; or
acquiring a time used by each BE service user transferring the BE service data equaling to the predetermined period of time; and multiplying a number of BE service users transferring the BE service in the predetermined period of time with the predetermined period of time.

6. The method for measuring a forward load in a sector according to claim 4, wherein the determining of the user equivalent rate comprises:
taking the calculation result as the user equivalent rate; or
filtering the calculation result, and taking the filtered result as the user equivalent rate.

7. The method for measuring a forward load in a sector according to claim 6, wherein
the user equivalent rate in a previous period of time T(n−1) is AvgTh(n−1), a weight of AvgTh(n) in the filtering process is α, and a formula for performing a filtering process on AvgTh(n) is as follows:

$$AvgTh(N)=(1-\alpha)AvgTh(n-1)+\alpha AvgTh(n).$$

8. The method according to claim 1, wherein the calculating of the user equivalent rate of the BE service in the sector for the forward load, comprises:
acquiring a total amount of the BE service data transferred in the sector in the predetermined period of time according to an amount of BE service data transferred respectively by each BE service user in the predetermined period of time;
acquiring an average amount of the BE service data transferred in the predetermined period of time, according to the total amount of the BE service data and an amount of BE service users transferring the BE service data; and
determining the user equivalent rate according to a calculation result of dividing the average amount of BE service data by the predetermined period of time.

9. An apparatus for forward load control in a sector, comprising:
an apparatus configured to measure the forward load in the sector and to calculate a user equivalent rate of a BE service in the sector for measuring the forward load of the BE service in the sector, and output information about the user equivalent rate; and
a load control module configured to receive the information about the user equivalent rate from the apparatus for measuring the forward load in the sector, and to exercise access control over a new BE service user requesting to access the sector according to the user equivalent rate,
wherein the load control module is further configured to exercise access control over the new BE service user requesting to access the sector according to a preset access condition that comprises:
if the user equivalent rate in a certain period of time is lower than a rate access threshold but higher than a rate limit threshold, and a number of BE service users in the sector is larger than a maximum number of users in the sector, the new BE service user whose wireless environment measurement value is greater than a preset wireless environment access threshold is allowed to access; and
if the user equivalent rate in a certain period of time is lower than the rate limit threshold but higher than a rate control threshold, and the number of the BE service users in the sector is larger than the maximum number of users in the sector, the new BE service user is denied access,
wherein the rate access threshold is higher than the rate limit threshold, and the rate limit threshold is higher than the rate control threshold.

10. The apparatus for forward load control according to claim 9, wherein the load control module further comprises:
a second information storage module configured to save the information about the user equivalent rate from the apparatus for measuring the forward load in the sector and the information about the preset access conditions required by the access control, and to send the saved information to a first control module; and
the first control module configured to receive the information from the second information storage module, and to exercise access control over the new BE service user requesting to access the sector according to the access conditions and the user equivalent rate.

11. The apparatus for forward load control according to claim 9, wherein the load control module further comprises:
a third information storage module configured to save the information about the user equivalent rate from the measurement apparatus and a preset load control condition, and to send the saved information to the second control module; and
a second control module configured to receive the information from the third information storage module, and to delete a BE service user in the sector according to the load control condition and the user equivalent rate.

* * * * *